United States Patent

Coppinger et al.

[19]

[11] Patent Number: 5,991,615
[45] Date of Patent: Nov. 23, 1999

[54] TRUCK COMMUNICATION SYSTEM

[75] Inventors: James B. Coppinger; Robert V. Helms, both of Chattanooga, Tenn.

[73] Assignee: Transcommunications, Inc., Chattanooga, Tenn.

[21] Appl. No.: 08/912,704

[22] Filed: Aug. 18, 1997

[51] Int. Cl.[6] .................................................. H04Q 7/20
[52] U.S. Cl. ...................... 455/406; 455/405; 455/410; 455/427; 455/560
[58] Field of Search .................................. 455/38.1, 38.4, 455/345, 517, 227, 228, 410, 411, 405, 406, 407, 12.1, 560, 426; 348/1; 340/825.44

[56] References Cited

U.S. PATENT DOCUMENTS

| | | | |
|---|---|---|---|
| 4,901,307 | 2/1990 | Gilhousen et al. | 370/18 |
| 4,979,170 | 12/1990 | Gilhousen et al. | 455/12.1 X |
| 5,020,077 | 5/1991 | Rhodes | 375/8 |
| 5,142,278 | 8/1992 | Moallemi et al. | 340/825.06 |
| 5,297,249 | 3/1994 | Bernstein et al. | 345/356 |
| 5,404,568 | 4/1995 | Yamagishi | 455/12.1 |
| 5,479,475 | 12/1995 | Grob et al. | 379/58 |
| 5,535,430 | 7/1996 | Aoki et al. | 455/12.1 |
| 5,608,722 | 3/1997 | Miller | 370/320 |
| 5,613,196 | 3/1997 | Barnes et al. | 455/15 |
| 5,774,802 | 6/1998 | Tell et al. | 455/406 X |
| 5,778,313 | 7/1998 | Fougnies | 455/408 X |

Primary Examiner—Wellington Chin
Assistant Examiner—Yemane Woldetatios
Attorney, Agent, or Firm—Luedeka, Neely & Graham PC

[57] ABSTRACT

A communication system for transmitting messages includes a mobile private communication system. The mobile private communication system has a mobile terminal disposed in each of a plurality of trucks, the mobile terminal having a transceiver, an electronic control unit in communication with the transceiver, and a display in communication with the electronic control unit for displaying the messages. A satellite transmits the messages to the mobile terminal, and a satellite dish transmits the messages to the satellite. A satellite hub converts the messages to a satellite transmittable form. An interface is provided, having a local management system for adjusting an account for each of the messages being transmitted to the mobile terminal, and further for ensuring that the account has a sufficient balance prior to transmitting messages to the mobile terminal. The interface also has a voice response unit for creating messages, and a telephone interface system for receiving operator input and selecting one of the messages in response to the operator input. A public communication system, including a public telephone system having telephones connected to a telephone network interface, transmits the operator input to the telephone system.

19 Claims, 11 Drawing Sheets

TRUCK COMMUNICATION SYSTEM

FIELD

The present invention relates to communication systems, and more particularly to a communication system and method for interfacing a public communication system with a mobile private communication system.

BACKGROUND

Operators of over-the-road vehicles, such as truck drivers, are often contacted while in transit by a dispatcher at a base station, who has been asked to relay a personal message. The trucking company typically has a private communication system (such as CB, shortwave radio, satellite, or other mobile communication system), so that it can contact the truck driver for company business while the truck is on the road. Relaying personal messages to the truck driver may be a severe burden on the dispatcher, who may receive many such personal messages to relay to many different truckers. Also, the dispatcher at the base station may fail to relay an urgent message to the truck driver or fail to deliver the urgent message on a timely basis. Thus, it is often difficult for someone to get a personal message to the truck driver.

The truck driver typically cannot use the private communication system to reach the party who has sent the personal message. If the message is urgent, such as "call home immediately," the truck driver must search for a pay phone, which may be miles away. Once at the pay phone, the driver often must search for change or a phone card to return the call, and may encounter busy signals or have to leave a message because the person trying to contact the truck driver is not present. These inconveniences result in lost time to the fleet and the truck driver, who is typically trying to reach a destination within a set time period.

The problem with the present system is that there is no way for the truck driver to use the private communication system to contact the other person over the public communication system, without having the dispatcher physically relay the message between the private communication system and the public communication system. Similarly, there is no way for the other person to use the public communication system to contact the truck driver over the private communication system, without again having the dispatcher physically relay the message between the public communication system and the private communication system.

SUMMARY

The above difficulties and disadvantages of the prior art are overcome by a system for sending a selected message from an authorized user to a mobile terminal in a truck, in which a public communication system has a telephone for inputting an identification number associated with the mobile terminal. An interface receives the identification number, and means are provided for checking the identification number against a list of valid identification numbers. Means present a menu of messages on the telephone, and the telephone is used for selecting one of the messages in response to input from the authorized user. Means are provided for adjusting an account associated with the identification number, converting the selected message to a satellite communication format, transmitting the converted selected message to a satellite, and relaying the converted selected message from the satellite to the mobile terminal. Means display the converted selected message on the mobile terminal.

Preferably the identification number associated with the mobile terminal is a user ID, and the interface has means for selectively associating the user ID with any one of a plurality of mobile terminal identification numbers. The means for adjusting the account may have means for preventing the transmitting means from transmitting the converted selected message to the satellite if the account associated with the identification number does not have at least a predetermined balance. Further, the means for adjusting the account may have means for adjusting a credit card account associated with the identifications number, or for adjusting a payroll account associated with the identification number.

A communication method provides a public communication system for receiving an identification number from an authorized user. A plurality of messages is communicated to the public communication system, and one of the plurality of messages is selected using the public communication system. An account associated with the identification number is checked for a balance sufficient to send the selected one of the plurality of messages, and the account associated with the identification number is adjusted. If the account balance is sufficient the selected one of the plurality of messages is sent to a private communication system.

A communication system for transmitting messages includes a mobile private communication system. The mobile private communication system has a mobile terminal disposed in each of a plurality of trucks, the mobile terminal having a transceiver, an electronic control unit in communication with the transceiver, and a display in communication with the electronic control unit for displaying the messages. A satellite transmits the messages to the mobile terminal, and a satellite dish transmits the messages to the satellite. A satellite hub converts the messages to a satellite transmittable form. An interface is provided, having a local management system for adjusting an account for each of the messages being transmitted to the mobile terminal, and further for ensuring that the account has a sufficient balance prior to transmitting messages to the mobile terminal. The interface also has a voice response unit for creating messages, and a telephone interface system for receiving operator input and selecting one of the messages in response to the operator input. A public communication system, including a public telephone system having telephones connected to a telephone network interface, transmits the operator input to the telephone system.

Other objects, features and advantages will become apparent by reference to the following detailed description when considered in conjunction with the accompanying drawings.

DETAILED DESCRIPTION

Figure 1:
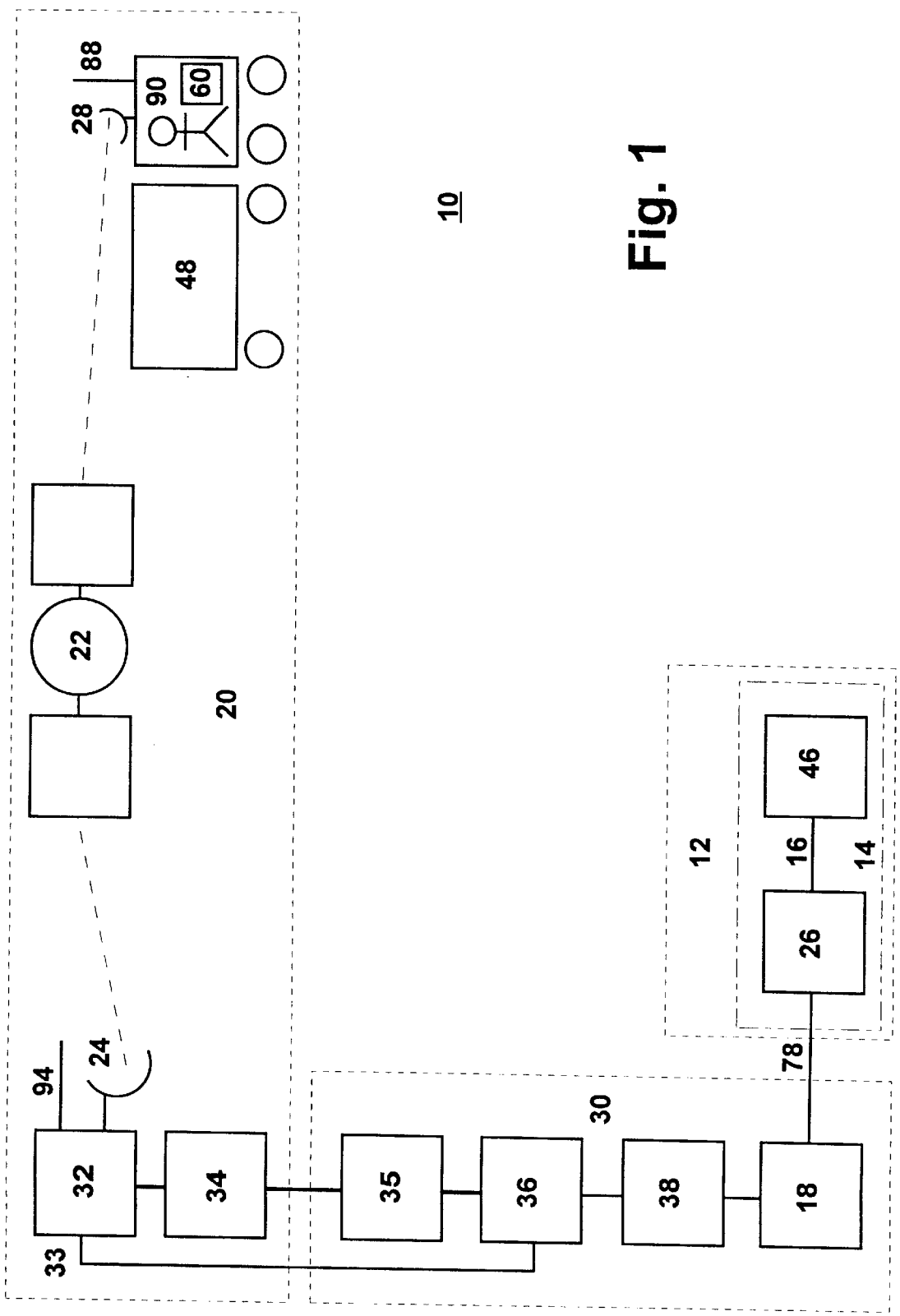
FIG. 1 depicts a communication system for interfacing a public communication system with a mobile private communication system.

Commencing with FIG. 1, a communication system 10 for interfacing and transmitting messages between a public communication system 12 and a mobile private communication system 20 is shown. The private communication system 20 includes a communication device such as a satellite dish 28 or preferably an antennae 88, which is mounted in a plurality of vehicles, such as a fleet of semi-trailers or trucks 48. The satellite dish 28 or antennae 88 is connected to a mobile terminal 60, which can be cellular based, but is preferably satellite based for transmitting messages to, and receiving messages from, a satellite 22. The mobile terminal 60 is discussed in greater detail below. The satellite 22 sends and receives messages to and from a satellite dish 24 or antennae 94, which is in communication with a satellite hub 32, which processes the messages sent to and from the satellite 22 into computer readable form. Further included in the satellite hub 32 is a satellite network interface for communicating with the satellite 22.

A fleet computer system 34 is also a part of the private mobile communication system 20. The fleet computer system 34 is typically located at the headquarters or dispatch center for a trucking company. The fleet computer system 34 is connected to an interface 30, which contains means for interfacing the public communication system 12 to the private communication system 20. The fleet computer system 34 is connected to a remote management system 35, which is a part of the interface 30. However, the remote management system 35 preferably resides as a software routine on the fleet computer system 34, and is added to the fleet computer system 34 to implement the method.

The remote management system 35 is in communication with a local management system 36. Preferably, the local management system 36 physically resides at a location apart from the fleet computer system 34, and may be in communication with many remote management systems 35 and fleet computer systems 34. Some fleet computer systems 34 may not be able to host the remote management system 35, and thus would not be able to communicate with the local management system 36. In this event, the satellite hub 32 would be in direct communication with the local management system 36, such as by line 33.

The local management system 36 is in communication with a voice response unit 38, which provides messages for selection and transmission to the truck driver 90. The voice response unit 38 is connected to a telephone interface system 18, which is in turn connected to a telephone network interface 26 via line 78, which is a part of a public telephone system 14, and also a part of the public communication system 12. The telephone network interface 26 is connected to telephones 46 via lines 16. The telephones 46 of the public communication system 12 are one means by which a message may be relayed to the truck driver 90.

Each of the trucks 48 is operated by a truck driver 90 who may either send or receive a message over the private mobile communication system 20, and is thus either a private sender or a private recipient of a message. The truck driver 90 has a unique identification number and an account, such as a sum of money, associated with the unique identification number. A set amount of money can be adjusted in the account each time the truck driver 90 sends or receives a message between the private communication system 20 and the public communication system 12. The adjustment may be in the form of a debit for use of the interface 30, or may be a credit in the event of an overcharge, special promotion, deposit, or other event. Preferably, the local management system 36 administers the account.

The account is replenishable in a number of different ways. For example, the debits to the account can be deducted from the truck driver's payroll account. This can be done by transmitting information from the local management system 36 to the remote management system 35, which is in communication with the fleet computer system 34. Preferably, the fleet computer system 34 has access to the payroll account of the truck driver 90. Thus, the local management system 36 can request and receive authorization for an adjustment to the payroll account of the truck driver 90. This adjustment may be a debit, such as a one-time debit of a given amount of money, or a weekly debit of a given amount of money.

The account can also be replenished by automatically debiting the credit card of the truck driver 90. Further, the truck driver 90 may be required to keep a certain amount of money in the account in order to send and receive messages, which amount could be deposited in the account by any one of a number of payment methods, such as money transfer, personal check, money order, or credit card. The truck driver 90 could also replenish the account by sending a message to the fleet computer system 34 requesting a loan or transfer. Further, the account may be a credit account with a preset limit, against which the truck driver 90 may draw. The truck driver 90 can then be billed, such as monthly, for the debited amount of the account.

Thus, the truck driver 90 pays for the ability to send and receive messages between the private mobile communication system 20 and the public communication system 12. This payment may be on either a prepaid basis or a post-paid basis by reducing a balance in a prepaid account, debiting a declining balance account, drawing against a prepaid account, charging a credit card account, drawing against a payroll advance, drawing against payroll, or accumulating charges and sending an invoice for payment. Preferably, the local management system 36 provides the cost accounting means to administer the account associated with each unique identification number whenever a message is transmitted to or received from the mobile terminal 60.

In operation, a person seeking to send a message to the truck driver 90 in one of the trucks 48 uses the telephone 46 to access the telephone interface system 18, and is prompted to input the unique identification number for the truck driver 90 and select one of a plurality of messages, discussed in greater detail below. The person may select the message by either pressing a button on the telephone 46 or speaking a command into the telephone. The message will then be sent from the public telephone system 14 of the public communication system 12 via interface 30 to the mobile terminal 60 of the private communication system 20.

The interface 30 also provides the driver 90 with the ability to send messages to a voice mailbox associated with the unique identification number. The messages may be entered into the system as voice mail, such as by the driver 90 using the public telephone system 14 to access the interface 30, entering the unique identification number, and speaking a message into the system. The system then records the message, and plays the message back when the driver 90, or another person, accesses the interface 30 from the public telephone system 14, enters the unique identification number, and requests voice mail messages.

Additionally, the driver 90 can access the interface 30 from the private mobile communication system 20 using the mobile terminal 60. The message is entered as text on the mobile terminal 60, and relayed to the interface 30 as described in more detail below. The message can be accessed from the public telephone system 14 by dialing into the interface 30, entering the unique identification number, and requesting the text messages. The voice response unit 38 then coverts the text message to speech, and delivers it over the telephone.

The cost accounting means of the interface tracks the account balance associated with the unique identification number, for both the voice mail messages and the text to speech messages, and debits the account for the receipt of each message by the interface 30. If the account has a balance at least equal to an amount required to store the text or voice mail message, then it is stored by the interface 30 and is available to be accessed by the public communication system 12.

Typically, a given mobile terminal 60 will remain associated with a given truck 48, while many different operators 90 may operate the truck 48 and mobile terminal 60 from time to time. Thus, there is preferably a registration method for associating the driver's identification number, also referred to as an administration number or user ID, with the identification number of the mobile terminal 60. This registration procedure is most preferably done at the mobile terminal 60 by the driver 90, such as by entering the user ID during a registration, or log-on, procedure. Once the identification number of the driver 90 is associated with the identification number of the mobile terminal 60, the various elements of the system will know which truck 48 and mobile terminal 60 the messages containing the driver 90's identification number should be routed to.

Thus, a driver 90 may log on and off of different mobile terminals 60 over a period of time, and the messages to the driver 90 will always be properly routed. The driver 90 may log off of a given mobile terminal 60 without immediately logging back on to the same or a different mobile terminal 60. In this case, the messages to be sent to the driver 90 will be stored for at least a given length of time, and will be then sent to the proper mobile terminal 60 at such time that the driver 90 logs back on to the system.

Figure 2:
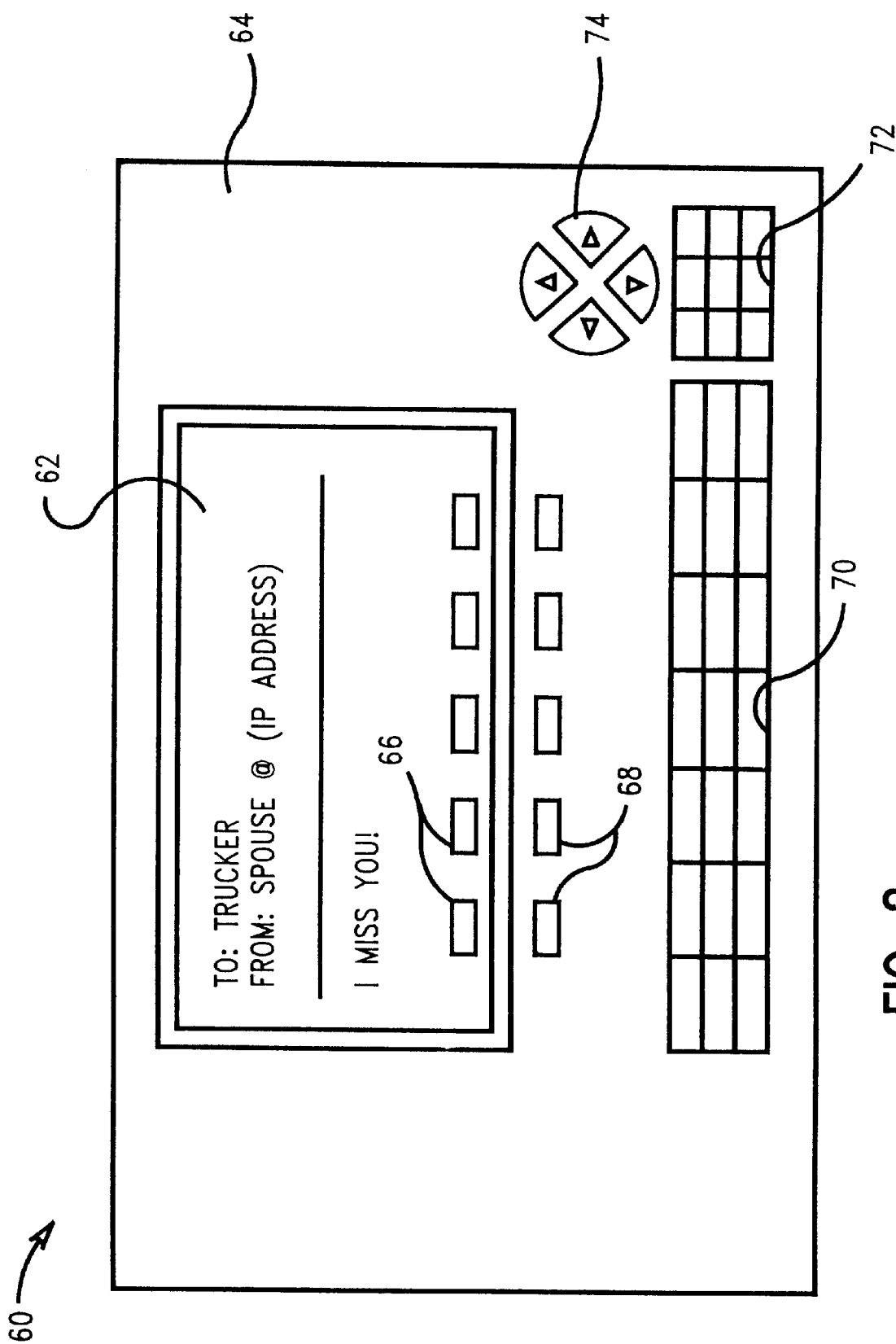
FIG. 2 depicts a mobile terminal.
Figure 3:
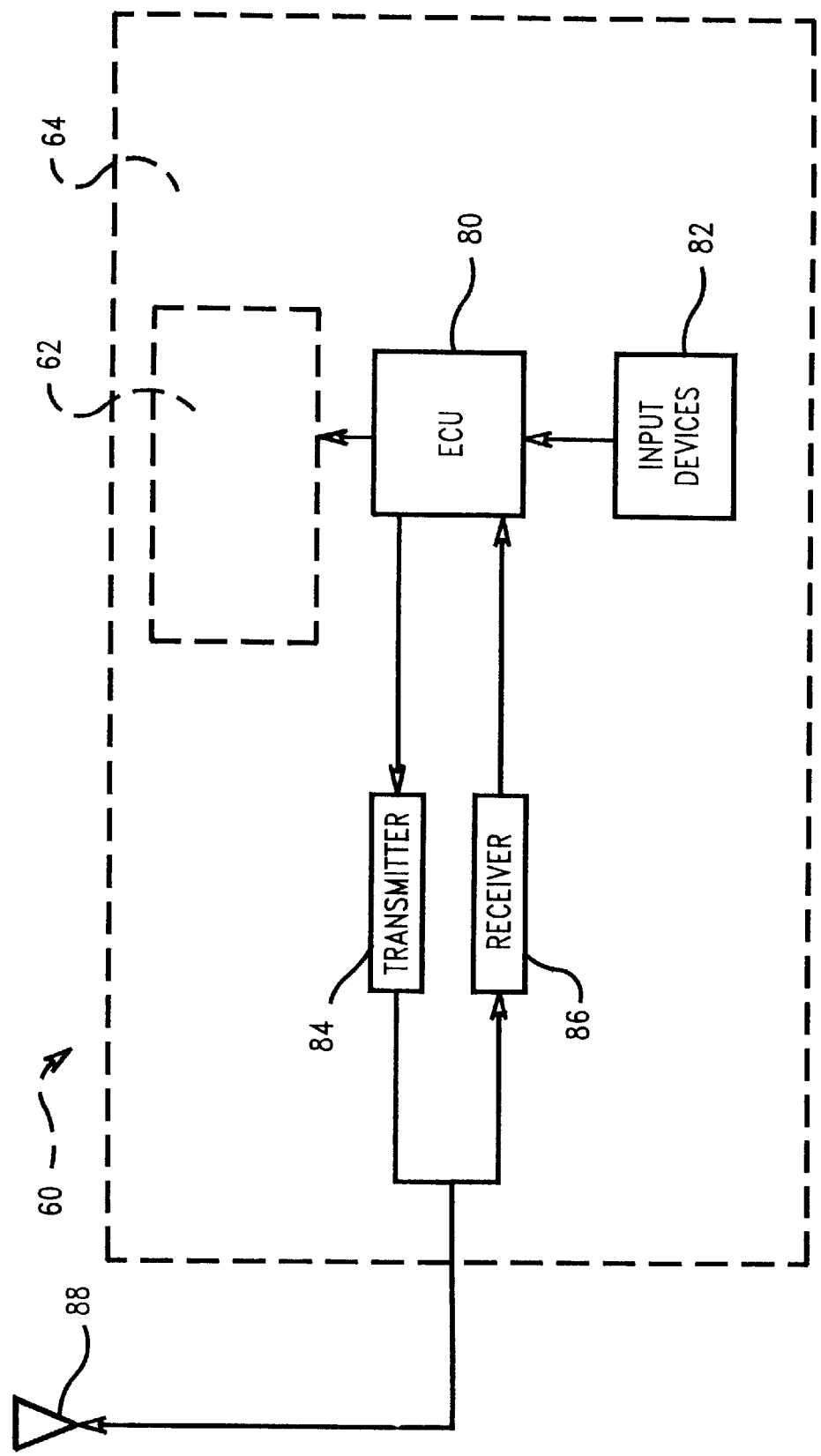
FIG. 3 is a circuit schematic of the mobile terminal.

The mobile terminal 60 is shown in greater detail in FIGS. 2 and 3. The mobile terminal 60 includes a display 62 for displaying messages. Shown on display 62 are a plurality of function indices 66 for prompting the truck driver 90, and which correspond to associated panel buttons 68. Further provided on mobile terminal 60 is an alpha keypad 70 and a numeric keypad 72. A cursor controlled device 74 is also mounted on display 62 for guiding a cursor around display 62.

As shown in FIG. 3, the mobile terminal 60 disposed in the truck 48 includes an electronic control unit 80 that has memory (volatile and non-volatile), bus lines (address, control and data) and other hardware, software, and firmware required for manipulation of the messages sent to and from the mobile terminal 60. In communication with the electronic control unit 80 are the input devices 82, which include the alpha keypad 70, numeric keypad 72, and cursor control device 74. Also in communication with the electronic control unit 80 is a receiver 86 for receiving the messages from the antennae 88 or satellite dish 28. The mobile terminal 60 also includes a transmitter 84, which transmits the messages from the mobile terminal 60 to the antennae 88 or satellite dish 28 and then to satellite 22. The transmitter 84 and the receiver 86 may be contained in a single transceiver unit having the functions and capabilities of each.

Figure 4A:
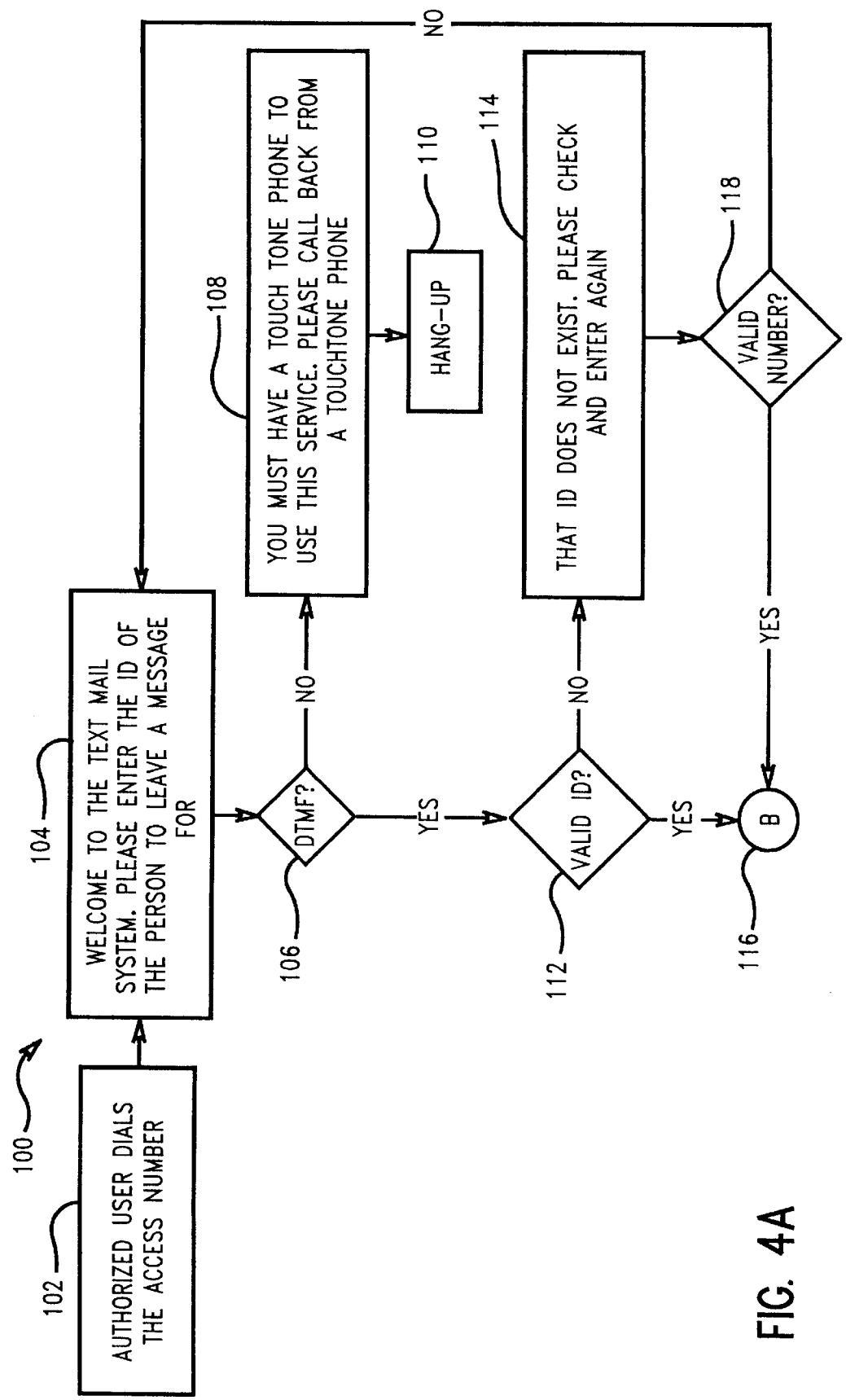
FIGS. 4A–4H are flow charts showing method steps.

Referring now to FIG. 4A, a communication method 100 is shown, which begins in task block 102 with an authorized user dialing into the telephone interface system 18 via a telephone 46 that is included in the public communication system 12. Next, in task block 104 a welcome message is presented to the authorized user on a telephone, such as by an audio signal, and the authorized user is prompted to enter the unique identification number of the truck driver 90.

The method 100 continues to task block 106 where the interface 30 determines whether a DTMF (dial tone modulated frequency) has been received from the telephone 46. If it has not, the method determines that the authorized user seeking to send a message to the truck driver 90 is calling from a non-touch tone phone. That authorized user is then prompted in task block 108 to call back at a latter time from a touch tone phone and the method continues to task block 110 and cuts off communication with the public telephone system 14 or hangs-up on the authorized user. If, however, it is determined in decision block 106 that the authorized user is calling from a touch tone phone, the method continues to decision block 112 and determines whether a valid identification number, from a list contained within the fleet computer system 34, has been input.

If a valid identification has not been given, the method moves to task block 114 and notifies the authorized user that the identification number input into the phone 46 does not exist and the authorized user is requested to input a new identification number. The method then continues to decision block 118 whereby it is determined whether a valid identification number has been entered. If it has not, the method 100 returns to task block 104. If a valid identification number has been input in decision block 118 the method moves to circle 116, which continues in FIG. 4B. Similarly, if in decision block 112 the method determines that a valid identification number has been entered, the method continues to circle 116.

Figure 4B:
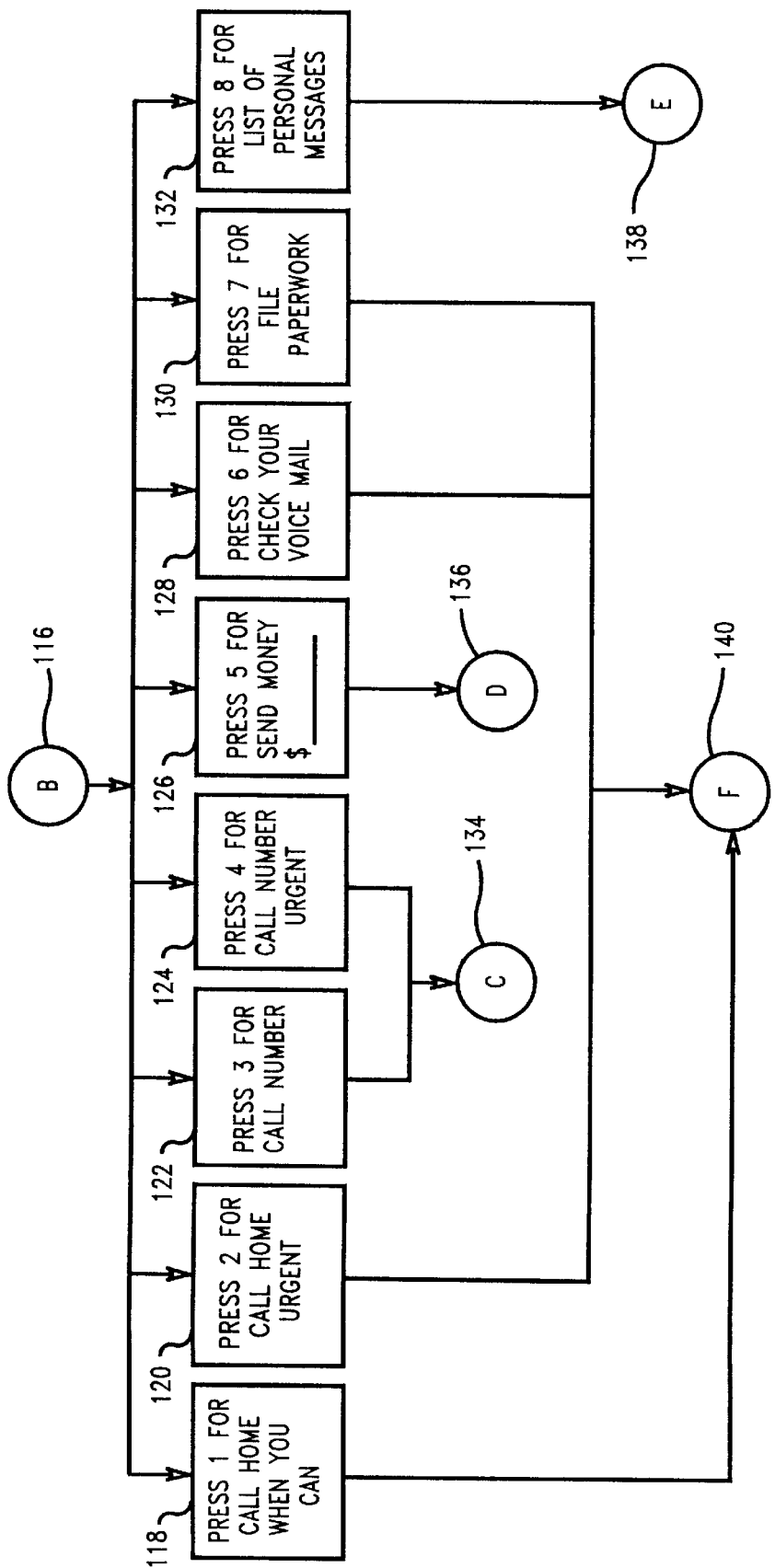

From circle 116 in FIG. 4B, the method prompts the authorized user as to a plurality of messages represented in blocks 118 through 132. It is expressly understood that the messages shown in these blocks are exemplary only, and may be any type of message desired to be communicated to the truck driver 90. In task block 118, the authorized user is prompted to press the number 1 for sending a message to the truck driver 90 in the form of "call home when you can." If a number 1 is pressed, the method continues to circle 140. In task block 120, the authorized user is prompted to press number 2 to send the message "call home urgent!" If the number 2 is pressed, the method again continues to circle 140. In task block 122, the authorized user is prompted to press number 3 to send the message "call number." If the number 3 is pressed, the method continues to circle 134. In task block 124 the authorized user is prompted to press number 4 to send the message "call number urgent!" If number 4 is pressed the method also continues to circle 134, which continues in FIG. 4C.

Figure 4C:
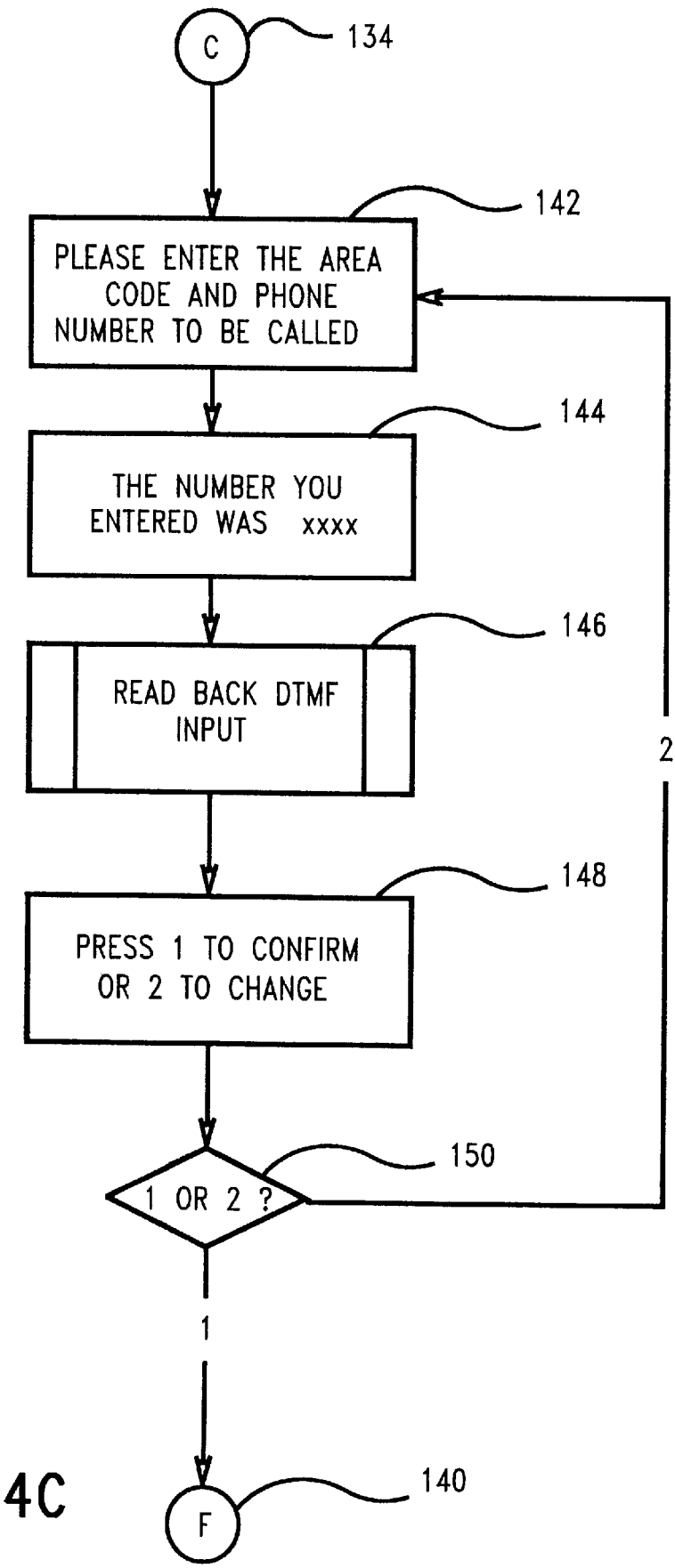

From circle 134 in FIG. 4C, the method continues to task block 142 whereby the authorized user is prompted to enter the area code and phone number that the truck driver 90 is requested to call. Once the number is input, the method continues to task blocks 144 and 146 whereby the number entered by the authorized user is read back to the operator for verification. The method next continues to task block 148 whereby the authorized user is prompted to press number 1 to confirm the telephone number entered or number 2 to change the telephone number entered. The method next continues to block 150 whereby if the number 2 is pressed, the method returns to task block 142 and prompts for a new area code and phone number to be entered by the authorized user. If, however, a number 1 is pressed, the method continues to circle 140.

Figure 4D:
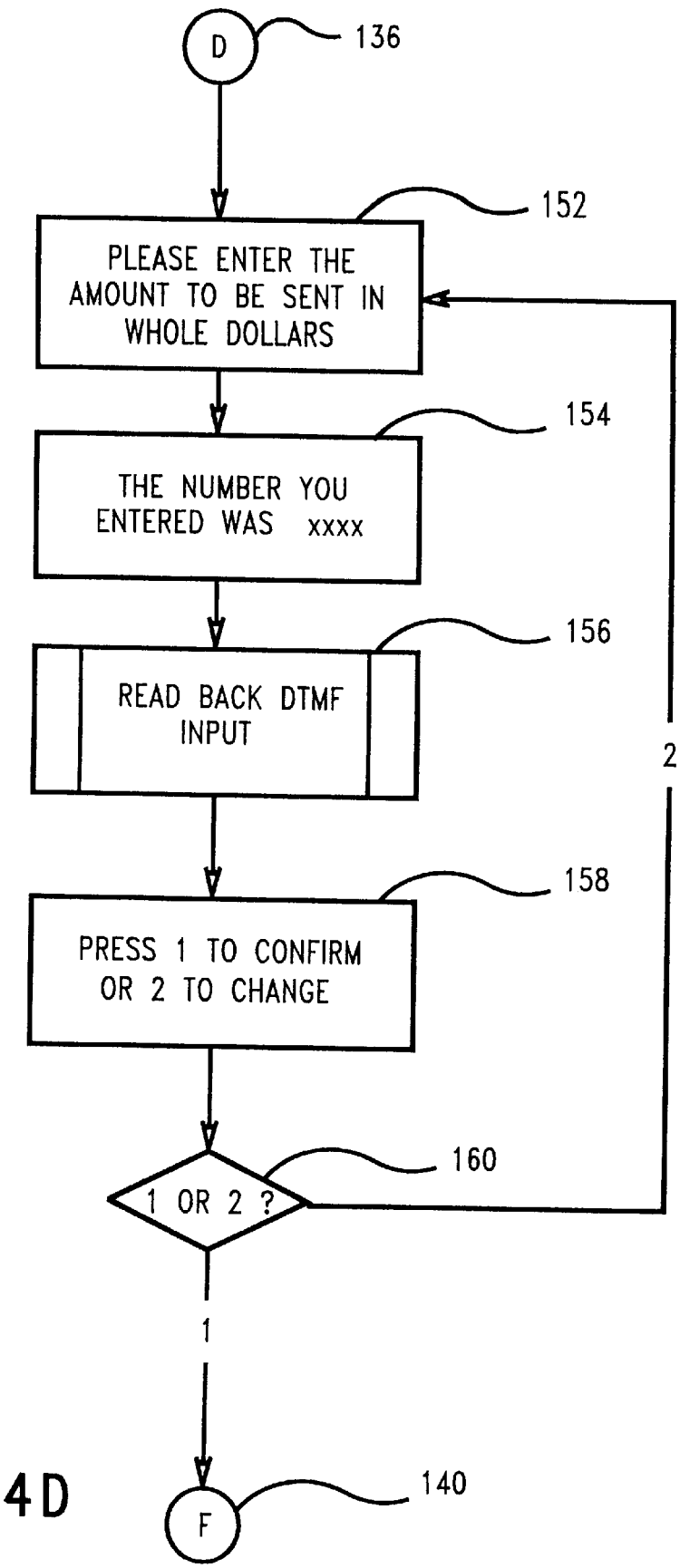

Returning to FIG. 4B, at task block 126, the authorized user is requested to press number 5 to send the message "send money," and the method continues to circle 136, which continues in FIG. 4D. From circle 136 in FIG. 4D the method continues to task block 152 and the authorized user is prompted to enter the amount of money to be sent in whole dollars. The method next continues to task blocks 154 and 156 whereby the amount of whole dollars entered is read back to the authorized user. The method then continues to task block 158 whereby the authorized user is requested to press number 1 to confirm the whole dollar amount or number 2 to change the amount. The method then continues to decision block 160 whereby it is determined whether number 1 or number 2 has been pressed by the authorized user. If number 2 has been pressed, the method returns to task block 152 whereby the authorized user is requested to enter a new dollar amount. If, however, in decision block 160 the number 1 is pressed, the method continues to circle 140.

Figure 4E:
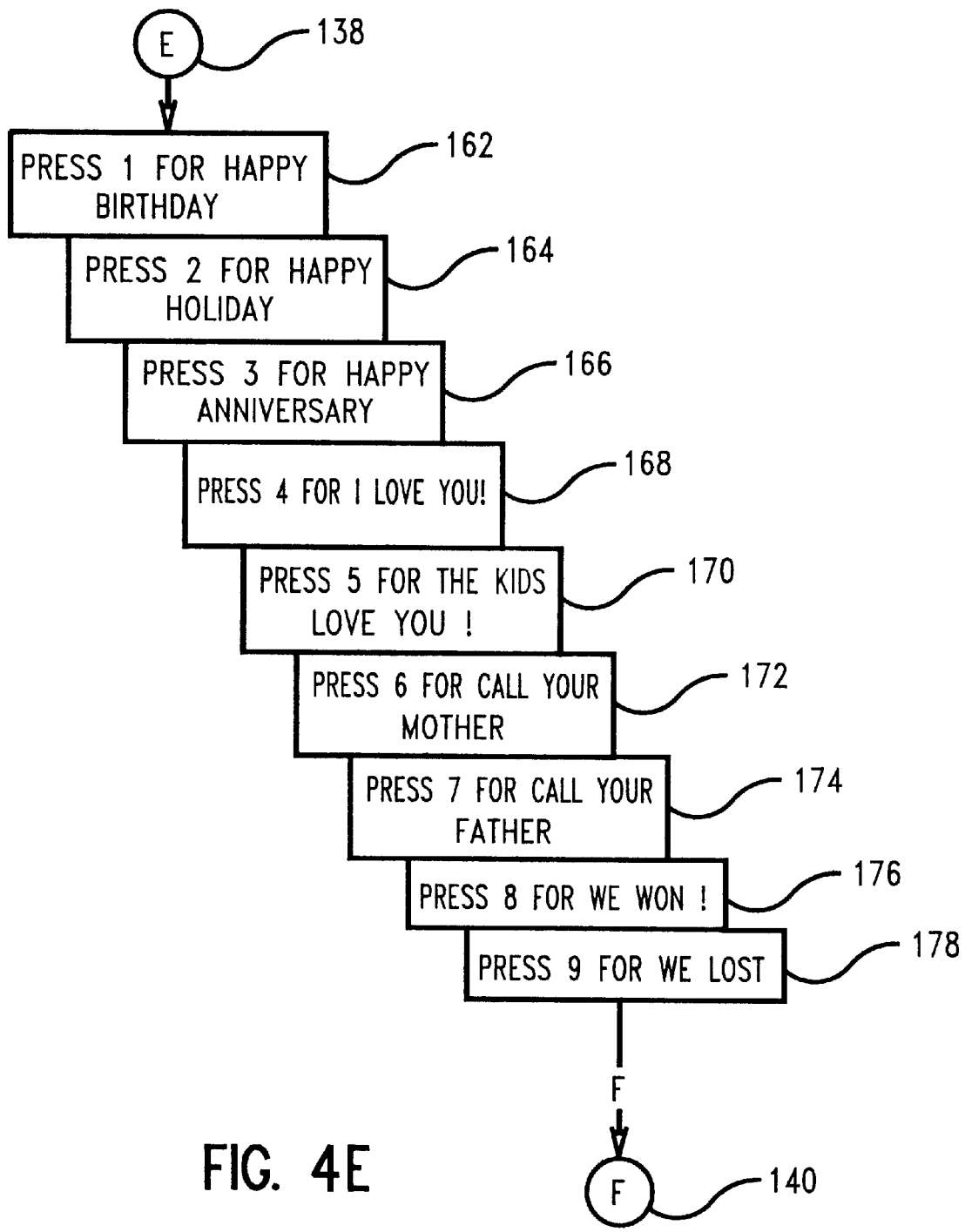

Returning now to FIG. 4B, in task block 132 the authorized user is requested to press number 8 to receive a listing of personal messages that can be sent to the truck driver 90. If number 8 is pressed, the method continues to circle 138, which continues in FIG. 4E. The method then repeats a plurality of personal messages in task blocks 162–182. It is expressly understood that these personal messages are exemplary only and can be of any nature or form.

In task block 162 the authorized user is prompted to press the number 1 to send the message "Happy Birthday." In task block 164 the authorized user is prompted to press the number 2 to send the personal message "Happy Holiday." In task block 166, the authorized user is prompted to press number 3 to send the message "Happy Anniversary." In task block 168 the authorized user is prompted to press number 4 to send the message "I Love You!" in task block 170 the authorized user is prompted to press number 5 to send the message "The kids love you!" in task block 172, the authorized user is prompted to press number 6 "Call your mother." In task block 174, the authorized user is prompted to press number 7 to send the message "Call your father". In task block 176, the authorized user is prompted to press number 8 to send the message "We won!" And in task block 178 the authorized user is prompted to press the number 9 to send the message "We lost." The method then continues to circle 140. At any time during the prompting of the personal messages in task block 162 through 182 the authorized user may press the prompted alpha-numeric key from the telephone 46 to send one of the personal messages to the truck driver 90.

Returning now to FIG. 4B, in task block 128 the authorized user is prompted to press number 6 to send the message "Check your voice mail." If the number 6 is pressed, the method continues to circle 140. In task block 130, the authorized user is prompted to press the number 7 to send the message "File paperwork." If number 7 is pressed, the method continues to circle 140, which continues in FIG. 4F.

Figure 4F:
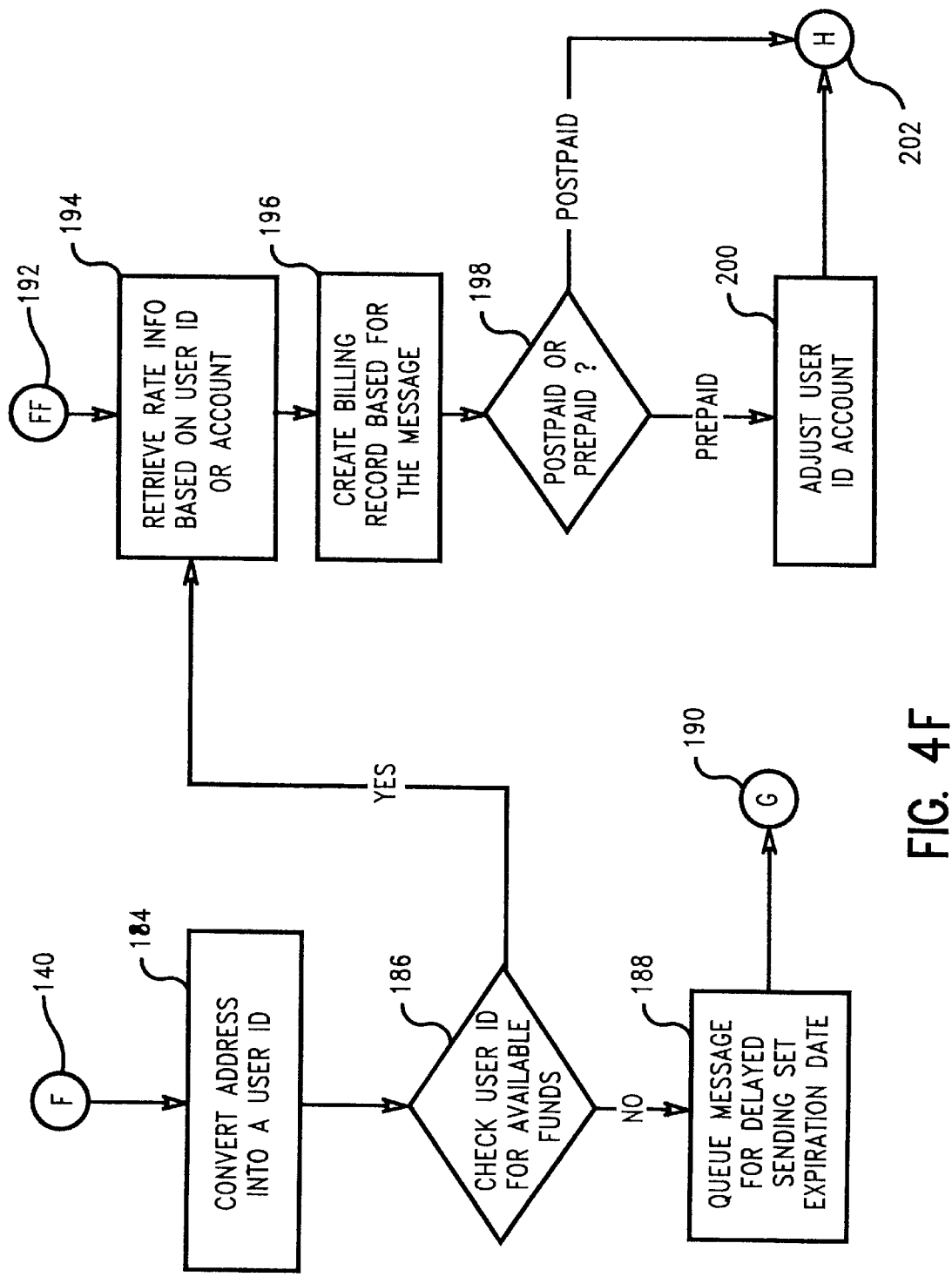

From circle 140 in FIG. 4F, the method continues to task block 184 whereby the address is converted or mapped into one of the unique user identifications stored in the fleet computer system 34 of the interface 30, and is converted into an electronic identification number. The method then continues to decision block 186 whereby the sum of money associated with the unique user identification is checked to determine whether the account associated with the user identification has a sufficient amount of money or credit or other authorization available to transmit the message. If it does not, the method continues to task block 188 whereby the message is cued for delayed sending to the truck driver 90 and an expiration date is set for the message. The method next continues to circle 190.

If, however, it is determined that the account does have sufficient money or authorization associated with the unique user identification, or is of the type that bills a credit card or debits a payroll account, then the method continues to task block 194 whereby the billing rate for transferring one of the messages to the truck driver 90 is determined from the unique user identification or a billing account associated with the unique user identification. The billing rate information is based on factors such as length of time the authorized user is in communication with the telephone system 18, length of the message sent to the truck driver 90, and any special billing fees to be added. The method next continues to task block 196 whereby a billing record is created for the message.

The method next continues to decision block 198 whereby it is determined whether the truck driver 90 will postpay or prepay for the cost associated with sending the message. If the account associated with the unique identification number is a postpaid account, the method continues to circle 202. If, however, the account is a prepaid account, a set amount of money is deducted from the sum of money associated with the unique user identification, and this amount is noted on billing records for the truck driver 90. The method then continues to circle 202.

Figure 4G:
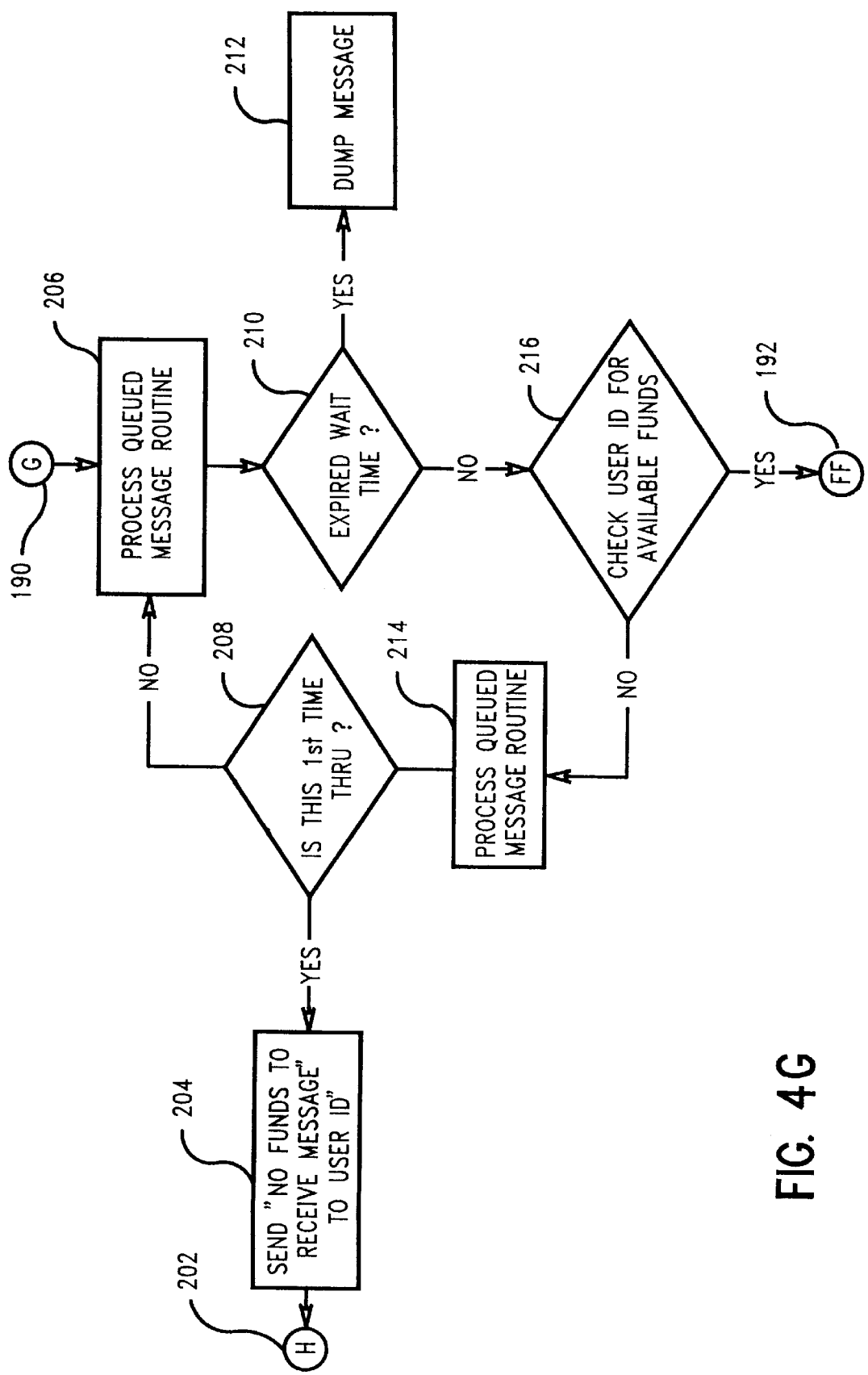

Referring now to FIG. 4G, from circle 190 the method continues to task block 206 whereby a software controlled message routine is implemented by the fleet computer system 34. For example, certain messages are given priority over other messages, such as "Call home, urgent." The method next continues to decision block 210 whereby it is determined whether the wait time for the delayed cued message in block 188 of FIG. 4F has expired. If it has, the method continues to task block 212 and deletes the message. If, however, the wait time has not expired, the method continues to decision block 216 whereby the account of the truck driver 90 is again checked to determine whether there is a sufficient sum of money therein. If there is sufficient money, the method continues to circle 192.

If, however, there are insufficient funds in the account the method continues to task block 214 whereby the process cued message routine is executed again as in task block 206. The method then continues to decision block 208 to determine whether it is a first pass through the method. If it is the first time through, the method continues to task block 204 whereby the message "No funds to receive message" is generated, and the method then continues to circle 202. On subsequent passes through the method, the method returns control to task block 206 to cycle through the routine again. Therefore, the method 100 allows the truck driver 90 an amount of time ranging from one hour to several weeks depending upon the wait time associated for the cued message stored in the fleet computer system 34. This allows the truck driver 90 sufficient time, such as over the span of a pay period, to replenish the account.

Figure 4H:
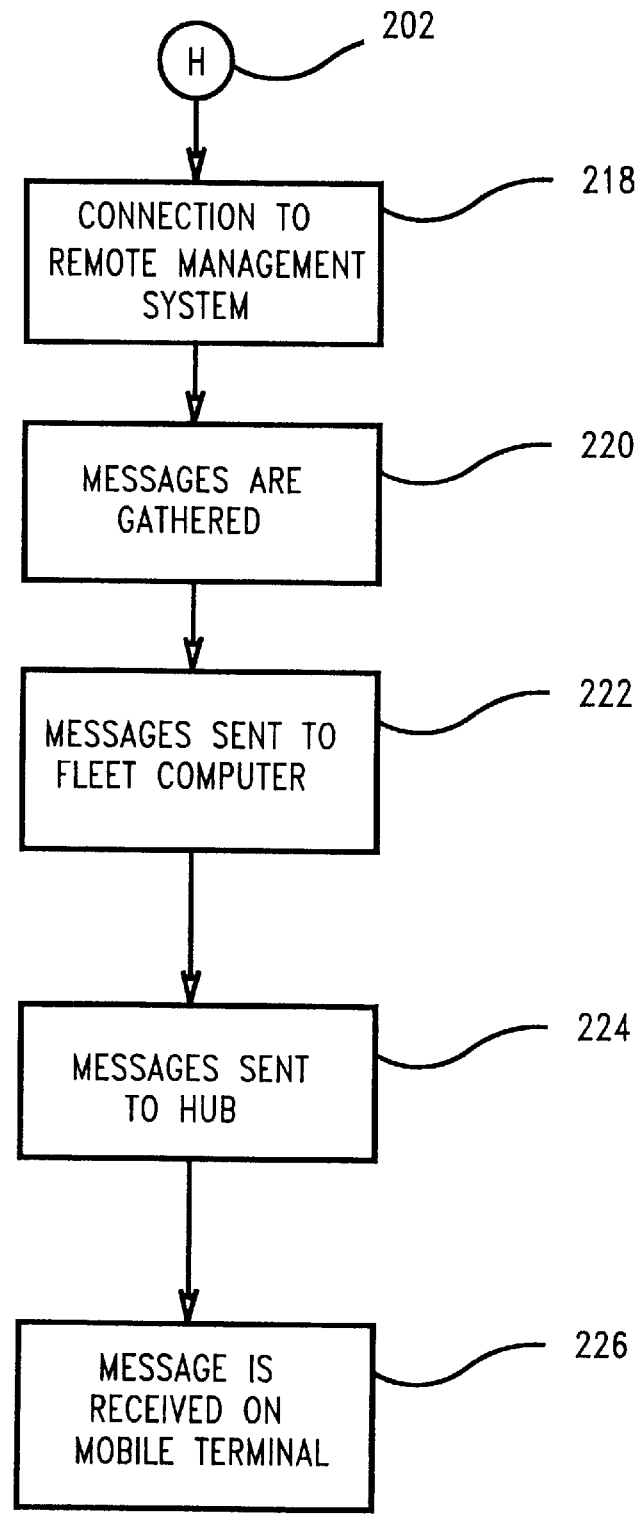

Circle 202 continues in FIG. 4H, whereby the method continues to task block 218 whereby a connection to a remote processor contained in the fleet computer system 34 is made, and in task block 220 the messages are gathered for the entire private communication system 20 having a fleet of trucks 48. The method then continues to task block 222 whereby the messages are separated into various groups for different fleets of trucks 48. This is also accomplished within the fleet computer system 34. The method then continues to task block 224 whereby the messages are sent to the satellite network interface 32, which beams the messages to the satellite 22. The method then continues to task block 226 whereby the messages are received by the mobile terminals 60.

While the description has been given in detail, it will be apparent to persons skilled in the relevant art that modifications may be made without departing from the spirit of the disclosure. Therefore, the above mentioned description is to be considered exemplary, rather than limiting, with the true scope defined in the following claims.

What is claimed is:

1. A system for sending a selected message from an authorized user to a mobile terminal in a truck, comprising:

a public communication system having a telephone for inputting an identification number associated with the mobile terminal, an interface for receiving the identification number, means for checking the identification number against a list of valid identification numbers, means for presenting a menu of messages as speech on the telephone, the telephone for further selecting one of the messages in response to input from the authorized user, means for adjusting an account associated with the identification number, means for converting the selected message to a satellite communication format, means for transmitting the converted selected message to a satellite, means for relaying the converted selected message from the satellite to the mobile terminal, and means for displaying the converted selected message as text on the mobile terminal.

2. The system of claim 1 further comprising:

the identification number associated with the mobile terminal being a user ID, and the interface further having means for selectively associating the user ID with any one of a plurality of mobile terminal identification numbers.

3. The system of claim 1 wherein the means for adjusting the account further comprises means for preventing the transmitting means from transmitting the converted selected message to the satellite if the account associated with the identification number does not have at least a predetermined balance.

4. The system of claim 1 wherein the means for adjusting the account further comprises means for adjusting a credit card account associated with the identification number.

5. The system of claim 1 wherein the means for adjusting the account further comprises means for adjusting a payroll account associated with the identification number.

6. A communication system for transmitting messages comprising:

a mobile private communication system including:

a mobile terminal disposed in each of a plurality of trucks and having a transceiver, an electronic control unit in communication with the transceiver, at least one input device in communication with the electronic control unit for inputting the messages as text, and a display in communication with the electronic control unit for displaying the messages as text; and a satellite for transmitting the messages to, and receiving the messages from, the mobile terminal;

an interface having a telephone interface system and a voice response unit, for transmitting the messages to the satellite, receiving the messages from the satellite, and converting the messages received from the satellite to speech, the interface adjusting an account for each of the messages being transmitted to or received from the mobile terminal; and a public communication system including:

telephones connected to a telephone network interface, a communication line connected between the telephone network interface and the telephone interface system, for presenting messages from the mobile terminal as speech, and inputting messages to be displayed as text on the mobile terminal.

7. The communication system of claim 6 wherein the transceiver further comprises an antenna.

8. The communication system of claim 6 wherein the transceiver further comprises a satellite dish.

9. The communication system of claim 6 wherein the interface further comprises a local management system for ensuring that the account has a sufficient balance prior to transmitting messages to, or receiving messages from, the mobile terminal.

10. A communication system for transmitting messages comprising:

a mobile private communication system including:

a mobile terminal disposed in each of a plurality of trucks and having a transceiver, an electronic control unit in communication with the transceiver, and a display in communication with the electronic control unit for displaying the messages as text;

a satellite for transmitting the messages to the mobile terminal;

a satellite dish for transmitting the messages to the satellite; and a satellite hub for converting the messages to a satellite transmittable form, an interface having;

a local management system for adjusting an account for each of the messages being transmitted to the mobile terminal, and further for ensuring that the account has a sufficient balance prior to transmitting messages to the mobile terminal, a voice response unit for creating messages as speech, and a telephone interface system for receiving operator input and selecting one of the messages in response to the operator input; and a public communication system including a public telephone system having telephones connected to a telephone network interface, for transmitting the operator input to the telephone system and receiving the selected one of the messages as speech and presenting it.

11. The communication system of claim 10 wherein the transceiver further comprises an antenna.

12. The communication system of claim 10 wherein the transceiver further comprises a satellite dish.

13. A communication method comprising the steps of:

providing a public communication system for receiving an identification number from an authorized user;

communicating to the public communication system a plurality of messages as speech;

selecting one of the plurality of messages using the public communication system;

checking whether an account associated with the identification number has a sufficient balance to send the selected one of the plurality of messages;

adjusting the account associated with the identification number; and sending the selected one of the plurality of messages as text to a private communication system if the account balance is sufficient.

14. The communication method of claim 13 further comprising the step of generating a bill for sending the message if the account balance is insufficient.

15. A communication system interface for receiving and transmitting messages between a public communication system and a private mobile communication system having different message formats, comprising:

receiving means having means for generating and selecting telephone messages from the public communication system and directed to a private recipient in the private mobile communication system, and for receiving messages from a private sender in the private mobile communication system and directed to the public communication system, translation means having means for converting the telephone messages received from the public communication system in the format of the public communication system into the format of the private mobile communication system and providing them as text, and for converting messages received from the private mobile communication system in the format of the private mobile communication system into the format of the public communication system and providing them as speech, transmitting means for transmitting messages received from the public communication system to the private mobile communication system, and for transmitting messages received from the private mobile communication system to the public communication system, and cost accounting means for adjusting the private recipient for messages transmitted on the private mobile communication system to the private recipient, and for adjusting the private sender for messages transmitted on the private mobile communication system from the private sender.

16. The communication system interface of claim 15 wherein the cost accounting means further comprises means for preventing the transmitting means from transmitting messages to the public communication system and the private mobile communication system if an account associated with the private recipient and the private sender does not have at least a predetermined balance.

17. The communication system interface of claim 15 wherein the cost accounting means further comprises means for adjusting a credit card account associated with the private recipient and the private sender.

18. The communication system interface of claim 15 wherein the cost accounting means further comprises means for adjusting a payroll account associated with the private recipient and the private sender.

19. A communication method comprising the steps of:

entering a text message associated with an identification number on a mobile terminal that is part of a private mobile communication system, sending the text message and the identification number from the mobile terminal to a satellite that is part of the private mobile communication system, receiving the text message and the identification number with the satellite, sending the text message and the identification number from the satellite to a satellite hub that is part of the private mobile communication system, receiving the text message and the identification number with the satellite hub, sending the text message and the identification number from the satellite hub to an interface, receiving the text message and the identification number with the interface, checking an account associated with the identification number to ensure that the account has a balance at least equal to an amount required to store the text message, storing the text message and the identification number in the interface when the account balance is at least equal to the amount required to store the text message, reducing the account balance by the amount required to store the text message when the account balance is at least equal to the amount required to store the text message, accessing the interface with a telephone that is part of a public communication system, sending the identification number to the interface using the telephone, accessing the text message associated with the identification number in the interface when the account balance is at least equal to the amount required to store the text message, converting the text message to a speech message with the interface when the account balance is at least equal to the amount required to store the text message, and sending the speech message from the interface to the telephone when the account balance is at least equal to the amount required to store the text message.

* * * * *